(12) United States Patent
Chandra et al.

(10) Patent No.: US 11,407,671 B2
(45) Date of Patent: Aug. 9, 2022

(54) PROCESS OF FABRICATION OF ERBIUM AND YTTERBIUM-CO-DOPED MULTI-ELEMENTS SILICA GLASS BASED CLADDING-PUMPED FIBER

(71) Applicant: COUNCIL OF SCIENTIFIC & INDUSTRIAL RESEARCH, New Delhi (IN)

(72) Inventors: Paul Mukul Chandra, West Bengal (IN); Dhar Anirban, West Bengal (IN); Das Shyamal, West Bengal (IN); Pal Mrinmay, West Bengal (IN); Bhadra Shyamal Kumar, West Bengal (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 487 days.

(21) Appl. No.: 16/243,621

(22) Filed: Jan. 9, 2019

(65) Prior Publication Data

US 2019/0375672 A1 Dec. 12, 2019

(30) Foreign Application Priority Data

Jun. 8, 2018 (IN) .............................. 201811021507

(51) Int. Cl.
| | | |
|---|---|---|
| C03B 37/018 | (2006.01) | |
| H01S 3/16 | (2006.01) | |
| H01S 3/067 | (2006.01) | |
| C03B 37/027 | (2006.01) | |
| C03C 25/105 | (2018.01) | |
| C03C 25/005 | (2018.01) | |

(52) U.S. Cl.
CPC .. *C03B 37/01853* (2013.01); *C03B 37/01838* (2013.01); *C03B 37/01869* (2013.01); *C03B 37/027* (2013.01); *C03C 25/005* (2013.01); *C03C 25/105* (2013.01); *H01S 3/06716* (2013.01); *H01S 3/06729* (2013.01); *H01S 3/06754* (2013.01); *H01S 3/1608* (2013.01); *H01S 3/1618* (2013.01); *C03B 2201/07* (2013.01); *C03B 2201/12* (2013.01); *C03B 2201/36* (2013.01); *C03B 2203/22* (2013.01); *C03B 2207/66* (2013.01)

(58) Field of Classification Search
CPC ...................... C03B 37/0183; C03B 37/01853
See application file for complete search history.

(56) References Cited

U.S. PATENT DOCUMENTS

| | | | |
|---|---|---|---|
| 5,790,722 | A | 8/1998 | Minden et al. |
| 5,881,197 | A | 3/1999 | Dong et al. |
| 5,966,491 | A | 10/1999 | DiGiovanni |
| 6,263,003 | B1 | 7/2001 | Huang et al. |
| 6,611,372 | B2 | 8/2003 | Peyghambarian et al. |
| 6,751,990 | B2 | 6/2004 | Bandyopadhyay et al. |
| 6,851,281 | B2 | 2/2005 | Sen et al. |
| 6,889,528 | B2 | 5/2005 | Sen et al. |
| 8,902,493 | B2 | 12/2014 | Dong et al. |
| 9,620,924 | B1 | 4/2017 | Creeden et al. |
| 2002/0126974 | A1 | 9/2002 | Bayart et al. |
| 2005/0022561 | A1* | 2/2005 | Guskov ............... C03B 37/0183 427/446 |
| 2007/0169698 | A1* | 7/2007 | Guskov ............... C03B 37/0183 427/446 |
| 2009/0126408 | A1* | 5/2009 | Bookbinder ...... C03B 37/01853 65/416 |
| 2009/0180174 | A1* | 7/2009 | Haruna ............. C03B 37/01853 65/390 |
| 2012/0014653 | A1* | 1/2012 | Ichii ...................... C03C 13/046 264/1.24 |
| 2012/0263428 | A1* | 10/2012 | Chen ................. C03B 37/01228 65/391 |
| 2013/0101261 | A1 | 4/2013 | Cadier et al. |
| 2016/0083284 | A1* | 3/2016 | Sen ....................... C03B 37/025 65/390 |

FOREIGN PATENT DOCUMENTS

| | | |
|---|---|---|
| EP | 0533324 A2 | 3/1993 |
| EP | 1043281 B1 | 10/2005 |

OTHER PUBLICATIONS

Vivona et al., "Influence of Ce3+ Codoping on the Photoluminescence Excitation Channels of Phosphosilicate Yb/Er-Doped Glasses", IEEE Photonics Technology Letters, vol. 24, No. 6, Mar. 15, 2012, pp. 509-511.
Pavlov et ai., "High-power high-repetition-rate single mode Er—Yb-doped fiber laser system", Optics Express, vol. 20, No. 9, Apr. 23, 2012, pp. 9471-9475.
Jing et al., "Er3+/Yb3+ Co-Doped Optical Fibers: Fabrication and Characteristics", International Conference on Electronics and Optoelectronics (ICEOE 2011), pp. 124-126.
Melkumov et al.; "Effects of Yb3+ and Er3+ Concentrations and Doping Procedure on Excitation Transfer in Efficiency in Er—Yb Doped Phosphosilicate Fibers", Inorganic Materials, 2010, vol. 46, No. 3, pp. 299-303.
Fujita et al., "High power narrow-linewidth linearly-polarized 1610 nm Er:Yb all-fiber MOPA", Optics Express, vol. 24, No. 22, Oct. 31, 2016, pp. 26255-26260.
Chen et al., "High power Er, Yb-doped superfluorescent fiber source with over 16 W output near 1.55 urn", Optics Express, vol. 20, No. 13, Jun. 18, 2012, pp. 14542-14546.
Lu et al., "A erbium/ytterbium co-doped double-cladding fiber amplifier with 36.4-dBm output power", Photonics North 2004, Proc. of SPIE vol. 5577, pp. 180-185.
Sanchez et al., "Characterization of a high-power erbium-doped fiber laser", International Journal of Microwaves Applications, 2(2), Mar.-Apr. 2013, pp. 89-92.

(Continued)

*Primary Examiner* — Cynthia Szewczyk (74) *Attorney, Agent, or Firm* — Renner, Otto, Boisselle & Sklar, LLP (57) ABSTRACT

The present application provides a process of fabrication of erbium and ytterbium-co-doped multielements silica glass based cladding-pumped fiber for use as a highly efficient high power optical amplifier.

11 Claims, 5 Drawing Sheets

(56) References Cited

OTHER PUBLICATIONS

Wang et al., "Yb/Er co-doped phosphate all-solid single-mode photonic crystal fiber", Scientific Reports, 2014, pp. 1-3.
Chu et al., "Ce3+/Yb3+/Er3+ triply doped bismuth borosilicate glass: a potential fiber material for broadband near-infrared fiber amplifiers", Scientific Reports, 2016, pp. 1-9.
Vienne et al.,, "Role of Aluminum in Ytterbium-Erbium Codoped Phosphoaluminosilicate Optical Fibers", Optical Fiber Technology 2, pp. 387-393, (1996), Article No. 0044.
Vienne et al., "Fabrication and Characterization of 3+ : Er3+ Phosphosilicate Fibers of Lasers", Journal of Lightwave Technology, vol. 16, No. 11, Nov. 1998, pp. 1990-2001.
Orignac et al., "Sol-gel silica/titania-on-silicon Er/Yb-doped waveguides for optical amplification at 1.5 um", Optical Materials 12 (1999) pp. 1-18.
Nandi et al., "Superfluorescence from Yb-and Yb—Er-doped phosphotellurite glass fibres", Optical Fiber Technology 14 (2008), pp. 275-280.
Goldberg et al., "High power side-pumped Er/Yb doped fiber amplifier", WA7-1, pp. 19-21.
Park et al., "High-Power Er—Yb-Doped Fiber Amplifier with Multichannel Gain Flatness within 0.2 dB over 14 nm", IEEE Photonics Technology Letters, vol. 8, No. 9, Sep. 1996, pp. 1148-1150.
J.K. Sahu et al., "A 103 W erbium-ytterbium co-doped large-core fiber laser", Optics Communications 227 (2003), pp. 159-163.

\* cited by examiner

PROCESS OF FABRICATION OF ERBIUM AND YTTERBIUM-CO-DOPED MULTI-ELEMENTS SILICA GLASS BASED CLADDING-PUMPED FIBER

RELATED APPLICATION DATA

This application claims the benefit of Indian Patent Application No. 201811021507 filed Jun. 8, 2018, the disclosure of which is herein incorporated by reference in its entirety.

FIELD OF THE INVENTION

The present invention relates to a process of fabrication of erbium and ytterbium-co-doped multi-elements silica glass based cladding-pumped fiber for use as a highly efficient high power optical amplifier.

The high power amplifier is very important in the field of telecommunication specially for Cable TV application (CATV), Free space communication system and Fiber to the Home (FTTH) as well as Nonlinear signal processing, Light detection and ranging (LIDAR), Optical data transport and Femtosecond pulse amplification.

BACKGROUND AND PRIOR ART OF THE INVENTION

Erbium (Er)—Ytterbium (Yb) co-doped fiber laser and amplifier are attracting a lot of research interest due to their wide range of application such as industry, medicine, communication, military and research operating around 1.55 µm region coinciding with lowest loss wavelength of conventional single mode silica glass fiber based devices. Cladding pumped Er—Yb doped fiber amplifier can serve as a suitable candidate for compact and efficient sources for high power continuous wave (CW) as well as high energy short pulse generation due to their high reliability, high beam quality and eye-safe operating zone. However, the development of a suitable Er—Yb co-doped fiber is associated with various technical challenges namely Photodarkening at high pump power, degradation of output power under radiative environment, and origination of self lasing around 1 µm which suppress the output power at 1.55-1.56 micron etc. The present invention relates fabrication of cladding pumped Erbium-Ytterbium co-doped multielement silica glass based radiation resistant optical fiber showing <10% degradation of lasing output power operating around 1.55-1.56 µm generating low to moderately high power (5.0-20.0 W) with slope efficiency >38.0% suitable for high-power EYDFA (Erbium Ytterbium Doped Fiber Amplifier).

The invention is particularly revealing use of multicomponent glass to achieve the radiation resistance behavior of fabricated fiber suitable for space communication besides elimination of self lasing around 1 µm region. The method describes selection of suitable glass composition to achieve moderate to high power amplification with adjustment of Er to Yb ratio operating around 1.55-1.56 µm region.

Reference may be made to U.S. Pat. No. 8,902,493 B2 by Liang Dong, Martin E. Permann, Hugh McKay, Libin Fu and Shigeru Suzuki, "Highly rare-earth-doped optical fibers for fiber lasers and amplifiers" wherein phosphosilicate glass containing about 50 mol % Phosphorous, Aluminium concentration variation within 0.5 to 1.5 mol %, Boron in the range of 0 to 25 mol %, Er and Yb ion concentration within 0.5 to 1 mol % which resulted gain within 100 to 500 dB/m. The resulting fiber exhibited saturated Photodarkening loss of less than 10 dB at emission wavelength.

Reference may be made to M. Vivona, S. Girard, T. Robin, B. Cadier, L. Vaccaro, M. Cannas, A. Boukenter and Y. Ouerdane [IEEE Photonics Technology Letters, Vol. 24 No. 6, 509-511 (2012)]"Influence of $Ce^{3+}$ codoping on the photoluminescence excitation channels of phosphosilicate Yb/Er-doped glasses" wherein phosphosilicate glass based optical fiber containing 8 at % P, 0.008 at % Er, 0.165 at % Yb and 0.009 at % Ce resulted infrared emission around 1535 nm.

Reference may be made to I. Pavlov, E. Ilbey, E. Dulgergil, A Bayri and F. Omer Ilday [Optics Express, Vol. 20, No. 9, 9471-9475 (2012)] "High-power high repetition-rate single-mode Er—Yb- doped fiber laser system" wherein Er—Yb-co-doped phosphosilicate fiber amplifier generated 10 W average output power with pulse duration of 0.45 sec with $M^2$ value of 1.06.

Reference may be made to U.S. Pat. No. 9,025,925 B2 by B. Cadier, A. Laurent, T. Robin, S. Girard and C. Marcandella "Radiation resistant rare-earth-doped optical fiber and method of radiation-hardening a rare-earth-doped optical fiber" wherein MCVD method coupled with solution doping is used to fabricate a fiber with core comprising up to 8 at % Phosphorous, about 100-1000 ppm Er, 500-10000 ppm Yb, with Yb to Er ratio between 12 to 25; Ce concentration between 500-10000 ppm and Yb/Ce ratio between 0.1 to 10, surrounded by a fluorinated silica cladding with Numerical Aperture (NA) higher than 0.4 and tested in an Co 60 γ radiation environment of does rate of the order of 1 krad/h with good radiation resistivity (degradation <20% of initial power).

Reference may be made to US Patent 2002/0126974 A1 by D. Bayart, F. Leplingard and L. Gasca "Double-Clad Optical Fiber and Fiber Amplifier" wherein the optical fiber core is doped with erbium ion (500-2500 ppm wt), Ytterbium ion concentration 1 to 100 times of Er concentration while Ce co-doping with concentration between 1 to 30 times of Er concentration.

Reference may be made to W. Jing, Z. Chen Fang, Z. SiWen, L. Zhen, K. ZeXin, S. Jiang, W. Chun Can and J. Shui Sheng, [ICEOE 2011] "$Er^{3+}/Yb^{3+}$ co-doped optical fibers: Fabrication and Characteristics" wherein Er/Yb co-doped optical fiber has been fabricated using heating modified MCVD method with core radius 0.57 mm, the refractive index difference between core and cladding about 0.75% and Yb absorption at 976 nm is about 588.8 dB/m.

Reference may be made to M. A. Melkumov, A. Yu. Laptev, M. V. Yashkov, N. N. Vechkanov, A. N. Guryanov and I. A. Bufetov [Inorganic Materials, Vol. 46 No. 3, 299-303 (2010)] "Effects of $Yb^{3+}$ and $Er^{3+}$ Concentrations and Doping Procedure on Excitation Transfer Efficiency in Er—Yb Doped Phosphosilicate Fibers" wherein Er/Yb co-doped phosphosilicate core fiber has been fabricated using MCVD coupled with chelate delivery technique is presented which comprises Er concentration from 0.07 to 0.4 wt % with Yb concentration from 0.4 to 8 wt %, which yields around 38% lasing efficiency with respect to absorbed pump power and 33% with respect to launched pump power.

Reference may be made to E. Fujita, Y. Mashiko, S. Asaya, M. Musha and M. Tokurakawa [Optics Express, Vol. 24, No. 22, 26255-26260 (2016)] "High power narrow-linewidth linearly-polarized 1610 nm Er:Yb all-fiber MOPA" wherein Er doped aluminosilicate fiber of core diameter 6.7 µm, NA 0.22 is used as first amplifier which is attached with second amplifier Er/Yb co-doped phosphosilicate double-clad fiber comprising core diameter of 6 µm, NA 0.2 which finally amplified by Er/Yb co-doped phosphosilicate fiber of core diameter 10 μm having NA 0.2 to achieve emission from 1610 to 1627 nm.

Reference may be made to W. Chen, D. Shen, T. Zhao and X. Yang [Optics Express, Vol. 20, No. 13, 14542-14546 (2012)] "High power Er, Yb-doped superfluroscent fiber source with over 16 W output near 1.55 μm" wherein Er/Yb co-doped fiber of core diameter 25 μm with NA 0.22 surrounded by pure silica cladding having D-shaped coated with low RI polymer coating to achieve effective NA of 0.4 with $Er^{3+}$ concentration of $0.51 \times 10^{20}$ cc and $Yb^{3+}/Er^{3+}$ doping ratio of 17 produced output power of 16.1 W exhibited lasing efficiency of 30.7% and bandwidth (FWHM) of 17 nm.

Reference may be made to Z. G. Lu, A. Lavigne, P. Lin and C. P. Grover [Photonics North 2004, Proc. of SPIE Vol. 5577] "A erbium/ytterbium co-doped double-cladding fiber amplifier with 36.4 dBm output power" wherein Erbium Ytterbium co-doped double clad optical fiber amplifier has been demonstrated which when combined EDF gain up to 71 dB and output power about 12.3 W around 550 nm has been achieved.

Reference may be made to F. Sanchez, F. Amrani, A. Niang, M. Salhi and A. Komarov, [International Journal of Microwaves Applications, Vol. 2, No. 2, 89-92 (2013)] "Characterization of high-power erbium-doped fiber laser" wherein 10 W Er/Yb fiber amplifier is presented which resulted 8 W power with 20% lasing efficiency.

Reference may be made to L. Wang, D. He, S. Feng, C. Yu, L. Hu, J. Qiu and D. Chen, [Scientific Reports 20 Aug. 2014] "Yb/Er co-doped phosphate all-solid single-mode photonic crystal fiber" wherein a phosphate glass comprising ($P_2O_5$—$Al_2O_3$—$K_2O$—$BaO$—$Sb_2O_3$—$La_2O_3$) containing 6 wt % $Yb^{3+}$ ions and 0.5 wt % $Er^{3+}$ ions Photonic Crystal Fiber is presented with 1.6 W output power with a lasing threshold of ~150 mW and slope efficiency of 21%.

Reference may be made to Y. Chu, J. Ren, J. Zhang, G. Peng, J. Yang, P. Wang and L. Yuan, [Scientific Reports 20 Sep. 2016] "$Ce^{3+}/Yb^{3+}/Er^{3+}$ triply doped bismuth borosilicate glass: a potential fiber material for broadband near-infrared fiber amplifiers" wherein glass samples of (40-x) $Bi_2O_3$-$50B_2O_3$-$10SiO_2$-$xCeO_2$-$1Yb_2O_3$-$0.5Er_2O_3$ (x=0, 0.1, 1, 3, 5, 10, 15, 20 in mol. %) were prepared by conventional melt-quenching method to enhance emission around 1.55 micron region.

Reference may be made to G. G. Vienne, W. S. Brocklesby, R. S. Brown, Z. J. Chen, J. D. Minelly, J. E. Roman, and D. N. Payne [Optical Fiber Technology, Vol. 2, 387-393 (1996)] "Role of Aluminium in Ytterbium-Erbium co-doped phosphoaluminosilicate optical fibers", wherein 0.6-0.8 mol % $Yb_2O_3$ was incorporated comprising 11-13 mol % $P_2O_5$ with Yb/Er ratio 20 containing 24 gm $AlCl_3.6H_2O$ in 200 ml water for efficient energy transfer from Yb to Er. The effect Al to P ratio have also investigated which revealed increasing Al concentration has no significant effect towards Yb/Er energy transfer with lasers emitting around 1.5 μm.

Reference may be made to G. G. Vienne, J. E. Caplen, L. Dong, J. D. Minley, J. Nilsson and D. N. payne, [Journal of Lightwave Technology, Vol 16, No. 11, 1990-2001 (1998)] "Fabrication and characterization of $Yb^{3+}$:$Er^{3+}$ phosphosilicate fibers for lasers" wherein Er/Yb co-doped phosphosilicate fibers fabricated by Modified Chemical Vapor Deposition (MCVD) coupled with solution doping technique are presented which comprises of 12 mol % $P_2O_5$ with $Yb^{3+}/Er^{3+}$ ratio was 3100 and 2400 dB/m for the absorption at 975 nm. Introduction of back-pass deposition technique is mentioned for the first time with optimization of pre sintering condition to achieve uniformity of rare earth distribution in final fiber.

Reference may be made to X. Orignac, D. Barbier, Xin M. Du, Rui M. Almeida, O. McCarthy and E. Yeatman, [Optical Materials, Vol. 12, 1-18 (1999) "Sol-gel silica/titania-on-silicon Er/Yb- doped waveguides for optical amplification at 1.5 μm" wherein $SiO_2$—$TiO_2$—$Er_2O_3$—$Yb_2O_3$—$Al_2O_3$ doped sol-gel layer is demonstrated which exhibited minimum propagation loss around 1.5 dB/cm for 5.7 cm length of fiber under total pump power of 100 mW.

Reference may be made to P. Nandi and G. Jose, [Optical Fiber Technology, Vol. 14, 275-280 (2008) "Superfluorescence from Yb- and Yb—Er-doped phosphotellurite glass fibres" wherein $P_2O_5$—$TeO_2$—$Er_2O_3$—$Yb_2O_3$ doped bulk glass and air clad multimode fibers have been reported comprising around 25 mol % $P_2O_5$ and around 0.25 mol % of $Er_2O_3$ & $Yb_2O_3$. This co-doped fiber exhibited ASE in 1000-1100 and 1450-1650 nm range simultaneously.

Reference may be made to L. Goldberg and J. Koplow, [WA7-1/19-WA7-3/23] "High power side-pumped Er/Yb fiber amplifier" wherein Er/Yb fiber of 6.6 μm core diameter with 130 μm hexagonal inner cladding with numerical aperture 0.45 exhibited attenuation co-efficient of 3.3 dB/m at 975 nm and produced 1.5 W and 1.1 W for the counter-propagating and co-propagating direction.

Reference may be made to N. Park, P. Wysocki, R. Pedrazzani, S. Grubb, D. DiGiovanni and K. Walker, [IEEE Photonics Technology Letters, Vol. 8, No. 9, 1148-1150, 1996] "High-power Er—Yb-Doped fiber amplifier with multichannel gain flatness within 0.2 dB over 14 nm", wherein Er—Yb co-doped fiber contain Er to produce 28 dB/m absorption at 1535 nm and 14× more Yb ions to produce 800 dB/m at 980 nm and about 3 dB/m absorption at 1064 nm containing 8 mol % P and small amounts of Al and Ge. This fiber exhibited low noise figure of 5.2 dB at −1 dBm signal input and a high output power up to 24.6 dBm.

Reference may be made to J. K. Sahu, Y. Jeong, D. J. Richardson and J. Nilsson, [Optics Communications Vol. 227 159-163, 2003] "A 103 W erbium-ytterbium co-doped large-core fiber laser", wherein Er—Yb co-doped optical fiber with 24 μm core having D-shaped inner cladding with NA 0.20 was fabricated using MCVD coupled with solution doping technique. The fabricated fiber exhibited small signal absorption 2.5 dB/m containing 2 wt % Yb ion which produced 103 W power at 1565 nm with slope efficiency 30% with respect to the launched pump power and 34% with respect to the absorbed pump power and for low power level efficiency reached up to 40%.

Reference may be made to S. Xi-Yi Huang and N. Sarma, U.S. Pat. No. 6,263,003 B1 (July 2001) "High-Power Cladding-Pumped Broadband fiber source and amplifier" wherein high levels of doping comprising combination of rare earth elements such as erbium-ytterbium-aluminum (Er—Yb—Al) or erbium-ytterbium-phosphorous (Er—Yb—P) with Er concentration ranging from 700-900 ppm, Yb 16000-23000 ppm and Al or P as much as possible such as greater than 6 mol % and 12 mol % respectively operating around 1550 nm.

Reference may be made to D. J. DiGiovanni, U.S. Pat. No. 5,966,491 A (October 1999) "Cladding-pumped fiber structure" wherein a triple clad structure consists of centrally-positioned single mode core within a multimode pump cladding which serve as an interface of a second cladding is proposed. The main core comprises of RE, about 3% $P_2O_5$ and 2% GeO2 followed by pump clad and second clad are made up of silica glass while all are enclosed with a polymer clad.

Reference may be made to L. Dong, L. Reekie and D. N. Payne, U.S. Pat. No. 5,881,197 A (March 1999) "Optical Fiber and Optical Fiber Device" wherein an optical fiber comprises of cladding glass layer surrounding a glass core with an annular layer suitable for photosensitivity is described. The phosphosilicate core layer of size 5 μm composed of $Er^{3+}$(500 ppm) and $Yb^{3+}$ (2000 ppm) surrounded by Ge/B doped photosensitivity regions and index difference of 0.013 between core and cladding region.

Reference may be made to Monica L. Minden and H. Bruesselbach, U.S. Pat. No. 5,790,722 (August 1998) "High Power Optical Amplifier/Laser system" wherein a 980 nm cladding pumped Yb-doped fiber laser grating is pumped with a multi transverse mode diode laser output beam of which is used as the pumping source for an Er-doped fiber to generate high power. The Yb-doped fiber grating laser and the Er-doped fiber amplifier/laser are preferably spliced directly to an input and and output arm of a WDM fiber coupler respectively.

Reference may be made to K. Tankala, EP 1,043,281 B1 (October 2005) "Method of fabricating preforms doped with rare earth metal for optical fibers" wherein a porous silica soot is soaked with Rare earth elements such as (Yb, Nd or Er) along with other co-dopants namely Al, P, Ge or B.

Reference may be made to N. Peyghambarian and S. Jiang, U.S. Pat No. 6,611,372 B1 (August 2003) "Erbium and Ytterbium co-doped phosphate glass optical fiber amplifiers using short active fiber length" wherein a phosphate glass fiber comprising P2Os (30-80%), Yb23 (0-12%), Er2O3 (2.5 to 12%) R2O (0-5%), L2O3 (5 to 30%), MO (5-30%) where R2O is selected from alkali metal oxides like Li2O, K2O, Na2O, Rb2O, MO is selected from alkaline earth oxide consisting of BaO, BeO, MgO, SrO, CaO, ZnO, PbO and La2O3 is selected from Ah03, B2O3, Y2O3 and La2O3 prepared using conventional glass melting technique process. This fiber produces a gain per unit length up to 3dB/cm at 1.54 μm when pumped with 980 nm light emitting laser diode using few cm fiber lengths.

Reference may be made to D. J. Creeden, J. R. Limongelli, H. S. Pretorius and S. D. Setzler, U.S. Pat. No. 9,620,924 B1, "Reduction of Yb-to-Er bottlenecking in co-doped fiber laser amplifier" wherein a plurality of didoes producing light having a wavelength in the range of 935 to 955 nm pumping the Er:Yb doped fiber off peak at 940 nm with the plurality of diodes to reduce Yb to Er bottlenecking with the Er:Yb doped fiber having a length greater than 5 μm to achieve output power in the 1550 nm region with optical efficiency greater than 50%.

Reference may be made to S. G. Grubb, W. L. Barnes, D. W. Anthon and J. E. Townsend, EP 0533,324 A2 (July 1992) "Sensitized erbium fiber optical amplifier and sources" wherein $Nd^{3+}$ lasers is used to pump the ytterbium and erbium co-doped single mode fiber to generate high power. The phosphate glass comprised of P, Ba, Al, K , Na, Ca besides active Er (0.5% by wt) and Yb ions (12% by wt), which resulted fiber numerical aperture of 0.14 while core diameter is 4.9 μm prepared using conventional rod in tube method.

Reference may be made to U.S. Pat. No. 6,751,990 B2, by T. Bandyopadhyay, R. Sen, S. K. Bhadra, K. Dasgupta and M. Ch. Paul, "Process for making rare earth doped optical fiber" wherein un-sintered particulate layer containing GeO2 and P2Os core layer is deposited and the porous soot layer soaked with an alcoholic/aqueous solution of RE-salts containing co-dopants like AlCh /Al(N03)3 in definite proportion is carried out. The porosity of the soot, dipping period, strength of the solution and the proportion of the co-dopants are controlled to achieve the desired RE ion concentration in the core and to minimize the core clad boundary defects. In subsequent steps drying, oxidation, dehydration and sintering of the RE containing porous deposit are performed followed by collapsing at a high temperature to produce the preform. The RE ion distribution in the resulting fibers matches with the Gaussian distribution of the pump beam to increase the overlapping and pump conversion efficiency.

Reference may be made to U.S. Pat. No. 6,851,281 B2, by R. Sen, M. Pal, M. C. Paul, S. K. Bhadra, S. Chatterjee and K. Dasgupta. "Method of fabricating rare earth doped optical fibre" wherein using MCVD process coupled with solution doping technique is used to develop matched or depressed clad structure inside a silica glass substrate tube followed by deposition of porous silica soot layer containing GeO2, P20s or such refractive index modifiers by the backward deposition method for the formation of the core. The deposited particulate layer is pre-sintered by backward pass with flow of GeCl4 and/or corresponding dopant halides and is soaked into an alcoholic/aqueous solution of RE-salts containing co-dopants such as AlCh in definite proportion. Further steps consist of oxidation, dehydration and sintering to obtain the RE containing porous deposit which on collapsing at a high temperature produces the preform. The fiber drawing was performed using conventional method to produce fibers with suitable core-clad dimensions and geometry.

Reference may be made to U.S. Pat. No. 6,889,528 B2, by R. Sen, M. Chatterjee, M. K. Naskar, M. Pal, M. C. Paul, S. K. Bhadra, K. Dasgupta, D. Ganguli, T. Bandyopadhyay and A. Gedanken, "Process of making rare earth doped optical fiber", wherein Rare earth oxide coated silica nanoparticles are used as the precursor materials which is applied in form of a stable sol as a coating material on the inner surface of silica tube following dip coating technique or any other conventional method. Al, Ge, P etc. was used as selected dopants and the coated tubes were further processed into optical preforms employing the conventional MCVD technique. The process eliminated deposition of porous soot layer and the formation of micro-crystallites and clusters of rare earth ions to enhance rare earth uniformity with improved process reproducibility.

Drawbacks of the Prior Arts

The drawbacks of the above mentioned references of prior arts are:—

The above mentioned prior art where the multielements doped silica glass based cladding pump fiber or the normal Er/Yb codoped phospho-silica glass based cladding pump fiber prepared either by conventional melting and quenching technique or MCVD with solution doping technique does not show both the good lasing efficiency above 38% as well as radiation resistance behavior at the same material composition. Additionally, radiation resistance property of those multicomponent glass based fibers were not evaluated in reported prior arts.

There are no documents disclosing multielement doped silica glass of composition $Al_2O_3$—$GeO_2$—$P_2O_5$—$B_2O_3$—$CeO_2$—F coating on silica glass along with active dopants such as $Er_2O_3$ and $Yb_2O_3$ to make fibers suitable for high power optical amplifier to be used specifically in free space communication.

Conventionally, Er—Yb doped fiber suitable for high power amplifier is associated with 1 μm self lasing at high pump power with poor lasing efficiency and believed to be a problem associated with improper Er—Yb energy transfer besides central dip in RI profile originated as a result of phosphorous evaporation and increased clustering phenomena. On top of that, due to formation of P—O defect center and Al—O defect center, at high pump power it could demonstrate photo-darkening effect which not only degrades the performance of the ultimate fiber but also restricts its application in space where there is radiation environment.

The analysis of the above prior-art also concludes that there are no documents disclosing the production of cladding pump Er/Yb codoped fibers suitable for high power optical amplifier by using modified chemical vapour deposition (MCVD) process in combination with solution doping technique including the steps of jacketing, grinding and polishing of preform into an octagonal cladding shape.

Prior arts related to the fabrication of suitable multicomponent core glass based fibers using MCVD with solution doping technique are not available comprising simultaneous doping of Al, Ge, P, B, F, Ce which found to be exhibit both radiation resistivity as well as avoiding self lasing at 1.0 micron during high power optical amplifier application.

Thus an optical fiber with suitable glass composition providing both low to moderately high output power (5 to 20 W) with good lasing efficiency >38.0% without self lasing around 1.0 micron as well as good output power stability under radiation environment, showing <10% degradation of lasing output power to be used efficiently as high power optical amplifier specifically in free space communication is not covered by a single prior art discussed above and need a complete solution.

Objects of the Present Invention

The main object of the present invention is to provide a method of making multielements silica based cladding pumped fiber for used as highly efficient high power optical amplifier which obviates the drawbacks as detailed above.

Another object of the present invention is to provide a process where multielements glass is used to incorporate rare earth ions namely Er and Yb through MCVD with solution doping technique for development of erbium and ytterbium co-doped cladding pump fibers for use as highly efficient high power optical amplifier.

Still another object of the present invention is to provide Er and Yb codoped multielements silica glass which suppress the formation of Al—O hole defect center to reduce the photodarkening effect under high power operation for getting good lasing efficiency.

Yet another object of the present invention is to provide Er and Yb codoped multielements silica glass where suitable doping levels of P and B enhance the energy transfer efficiency from Yb to Er through reducing the fluorescence lifetime of $^4I_{11/2}$ level of Er with increasing the fluorescence lifetime of $^4I_{13/2}$ level of Er to improve the lasing efficiency.

Still another object of the present invention is to provide Er and Yb codoped multielements silica glass having suitable Yb:Er ratio to achieve the lasing efficiency above 38.0% without $Yb^{3+}$ self lasing at 1.0 μm.

Yet another object of the present invention is to provide a process which minimize the central dip formation in the refractive index profile of fabricated fiber to improve the lasing performances.

Still another object of the present invention is to provide a method where Er, Yb and other multielements such as P, F, B, Ce, Al and Ge in multielements silica glass are incorporated uniformly along the core diameter of fibers in order to improve the amplification properties.

Another object of the present invention is to provide Er and Yb codoped multielements silica glass which make moderately high power (5.0-20.0 W) without 1.0 μm $Yb^{3+}$ self lasing.

Yet another object of the present invention is to provide Er and Yb codoped multielement silica glass which control the degradation of output power below 10% under $^{60}$Co-gamma radiation environment at low dose rates of 0.35-0.70 rad/s equivalent to dose rates in free space radiation.

SUMMARY OF THE INVENTION

Accordingly the present invention provides a process of fabrication of erbium and ytterbium-co-doped multielements silica glass based cladding-pumped fiber for use as a highly efficient high power optical amplifier, comprising the following steps:

a) Deposition of pure $SiO_2$ synthetic cladding within a silica glass substrate tube to obtain matched clad type structure, b) Deposition of fluorine doped porous phospho-silica layer forming a core by back-pass deposition technique, c) Pre-sintering of the porous soot layer to maintain uniform porosity keeping burner speed in forward direction, d) Soaking of the porous fluorinated phospho-silica layer into an alcoholic solution of a mixture of proper strength of $AlCl_3$, $6H_2O$, $ErCl_3$, $6H_2O$, $YbCl_3$ $6H_2O$, $CeCl_3$ $7H_2O$, $H_3BO_3$ to avoid clustering of Er and Yb ions under optimized conditions of soaking period, e) Incorporation of $Er_2O_3$, $Yb_2O_3$, $P_2O_5$, F, $CeO_2$, $Al_2O_3$, $B_2O_3$ into porous fluorinated phospho-silica glass matrix under optimized drying, oxidation and dehydration condition, f) Incorporation of $Er_2O_3$, $Yb_2O_3$, $P_2O_5$, F, $CeO_2$, $Al_2O_3$, $B_2O_3$, $GeO_2$ into silica glass matrix under optimized sintering condition, g) Incorporation of 2 to 3 numbers of Er & Yb doped multielements silica glass based layers through repetition of the above process from deposition of the porous layer to sintering maintaining all the process parameters same, h) Collapsing of the tube to achieve Er/Yb codoped multielements silica glass based optical preform of 10.0±0.1 mm diameter under optimized collapsing conditions, i) Increase of preform diameter from 10.0±0.1 mm to 18.5±0.1 mm through overcladding process using a thick silica tube of suitable dimension, j) Octagonal shaping of the overcladded preform through grinding and polishing process, k) Drawing of octagonal cladding shaped Er/Yb doped fiber with a low RI resin coating through optimization of drawing tension and drawing speed, l) Experiments for use of such fiber as high power optical amplifier in order to achieve maximum output power without showing 1.0 micron Yb lasing, m) Evaluation of the stability of output power of fabricated fiber in radiation environment through on-line measurement of lasing output power under variation of the radiation dose of $^{60}$Co gamma radiation from 0.35 to 0.7 rad/sec (equivalent to dose rates in free space) upto 6.0 Krad.

In one aspect of the present invention, the unsintered fluorinated phospho-silica core layer deposition temperature is selected preferably in the range of 1420-1455° C.

In another aspect of the present invention, the flow of $O_2/POCl_3$ and $SF_6$ during deposition of unsintered fluorinated phospho silica core layer is selected preferably in the range of 800-900 sccm for $O_2/POCl_3$ and 25-35 sccm for $SF_6$.

In yet another aspect of the present invention, the burner speed during backpass deposition of porous core layer maintained preferably in the range of 28-35 mm/min.

In still another aspect of the present invention, the porous soot layer was pre-sintered following forward pass deposition technique maintaining a temperature preferably within 1075-1125° C.

In another embodiment of the present invention, the burner speed during pre-sintering of porous core layer maintained in forward direction preferably in the range of 305-315 mm/min.

In another aspect of the present invention, the refractive index modifiers are $GeO_2$, $P_2O_5$, F or other glass forming oxides incorporated during core deposition.

In still another aspect of the present invention the strength of $ErCl_3$ $6H_2O$ in the range of 0.02-0.023(M) and $YbCl_3$ $6H_2O$ in the range of 0.25 (M) to 0.28(M) used in an ethanol in the process.

In yet another aspect of the present invention the strength of $AlCl_3$ $6H_2O$ in the range of 0.12-0.1(M) and $CeCl_3$ $7H_2O$ in the range of 0.003 (M) to 0.0035(M) used in an ethanol in the process.

In another aspect of the present invention, the strength of $H_3BO_3$ in the range of 0.5 (M) to 0.75 (M) in an ethanol used in the process.

In still another aspect of the present invention Yb to Er ratio is varied preferably from 7.5 to 11.

In yet another aspect of the present invention the ratio of He and $O_2$ fixed at 0.5 during oxidation.

In another aspect of the present invention the oxidation temperature varies preferably within 700 to 850° C.

In still another aspect of the present invention the dehydration temperature varies preferably within 850 to 900° C.

In yet another aspect of the present invention the sintering temperature varies preferably within 1350-1890° C.

In another aspect of the present invention the flow of $O_2/GeCl_4$ during sintering varies preferably from 5 to 10 sccm and the flow of $O_2/POCl_3$ varies preferably 10 to 15 sccm.

In yet another aspect of the present invention, the porous soot layer deposition, solution soaking and sintering processes repeated preferably 2 to 3 times.

In still another aspect of the present invention the $GeO_2$ concentration is controlled in the range of 1.5 to 2.5 wt %.

In another aspect of the present invention the incorporation of Er and Yb ions into multielements silica glass based multiple layers (2-3 nos) within the inner surface of the silica tube keeping the identical process parameters from deposition of porous layer to sintering stage for every layer through MCVD process with solution doping technique.

In yet another aspect of the present invention maintain low doping of $Al_2O_3$ preferably 0.356-0.525 wt % into Er and Yb doped multielements core glass sample to reduce the photodarkening phenomenon coming from aluminum oxygen hole centers.

In still another aspect of the present invention maintain the doping levels of $CeO_2$ within 0.12 to 0.191 wt %, $P_2O_5$ in the range of 22.0 to 23.85 wt %, $B_2O_3$ in the range of 0.95 to 2.51 wt %, F within 0.025 to 0.030 wt %, $Er_2O_3$ within 0.41-0.605 wt % and $Yb_2O_3$ 4.54-5.1 wt % in Er and Yb codoped multielements silica glass to improve the performance of high power optical amplifier.

In another aspect of the present invention, the compositions of the core and cladding glass can be adjusted to achieve NA of 0.19 to 0.25 and $RE^{3+}$ ion concentration in the range of 0.40 to 5.0 wt % in the ultimate fiber.

In yet another aspect of the present invention, the increase of preform diameter from 10.0±0.1 mm to 18.5±0.1 mm through the proper overcladding process using thick silica tube of OD/ID 20/12 mm. In still another aspect of the present invention, the Octagonal shaping of the overcladded preform by proper grinding process through milling of the silica cladding material varying the grinding length 0.72 to 0.75 mm from the periphery of circular overcladded preform at each point of eight positions separated by equal distances followed by polishing of each grinded sides.

In another aspect of the present invention, drawing of octagonal cladding shaped Er/Yb doped fiber with on-line low RI resin coating using PC 375 L AP low RI resin maintaining preform feed down speed preferably within 0.6-0.7 mm/min and fiber drawing speed preferably within 20-25 m/min.

In yet another aspect of the present invention, the compositions of the rare earth ions in multielement silica glass are adjusted to achieve amplification around 1558 nm with output power 5 to 20 W having lasing efficiency >38.0% without self lasing of $Yb^{3+}$ around 1.0 micron region.

In still another aspect of the present invention, the composition of doping host of rare-earths ions in multielement silica glass are designed to suppress the degradation of lasing output power (<10.0% of the initial power) under $^{60}Co$-gamma irradiation with variation of the dose rates from 0.35 to 0.70 rad/s (equivalent to dose rates in free space radiation) upto cumulative radiation dose of 6.0 Krad.

BRIEF DESCRIPTION OF THE DRAWINGS

The present invention is illustrated in FIGS. 1 to 10 of the drawings accompanying this specification.

DETAILED DESCRIPTION OF THE PRESENT INVENTION

Accordingly the present invention provides a process of fabrication of erbium and ytterbium-co-doped multi-elements silica glass based cladding-pumped fiber for use as a highly efficient high power optical amplifier, comprising the following steps:

(a) deposition of pure $SiO_2$ doped synthetic cladding within a silica glass substrate tube to obtain matched clad type structure; (b) forming a core by depositing fluorinated-phospho silica porous soot layer under flow of $O_2/POCl_3$ in the range of 800-900 sccm and flow of $SF_6$ in the range of 25-35 sccm at a tube surface temperature in the optimized range of 1420–1455° C. following back-pass deposition technique where burner speed maintained within 28-35 mm/min; (c) pre-sintering of the porous soot layer at optimized temperature in the range of 1075-1125° C. to maintain uniform porosity keeping the burner speed within 305-315 mm/min in forward direction; (d) soaking the porous fluorinated phospho silica layer for one hour into an alcoholic solution maintaining the strength of $AlCl_3$ $6H_2O$ in the range of 0.12 to 0.15(M), $ErCl_3$ $6H_2O$ in the range of 0.02 to 0.023(M), $YbCl_3$ $6H_2O$ in the range of 0.25 to 0.28 (M), $CeCl_3$ $7H_2O$ in the range of 0.003 to 0.0035(M) and strength of $H_3BO_3$ in the range of 0.5 to 0.75(M); (e) drying of the soaked core layer under flow of Ar inert gas for 30 to 45 minutes followed by oxidation in the presence of $O_2$ and He around 700-850° C. in a stepwise manner maintaining a constant $He/O_2$ ratio of 0.5; (f) dehydrating the soaked layer around 850-900 C with flow of He, $Cl_2$ and $O_2$ maintaining the ratio of $Cl_2/O_2$ 2.0 to 2.5; (g) sintering the porous layer in presence of a mixture of $O_2$ and He within 1350 to 1890° C. temperature range along with flow of $O_2/GeCl_4$ in the range of 5 to 10 sccm and $O_2/POCl_3$ in the range of 10 to 15 sccm; (h) repeating of the process steps from b) to g) 2 to 3 times to achieve desired core thickness of 10.0-11.5 µm with respect to 125 µm cladding diameter in fiber stage drawn from the overcladded preform; (i) collapsing the tube at a temperature above 2000° C. with flow of $O_2/POCl_3$ in the range of 4.0 to 7.0 sccm to obtain final preform; (j) jacketing of the preform with silica tubes of 20/12 OD/ID thick silica tubes to achieve preform diameter around 18.4-18.6 mm through the overcladding process using a thick silica tube at a temperature in the range of 2200 to 2400° C.; (k) grinding of the preform under optimized grinding length within 0.72-0.75 mm from the periphery of circular overcladded preform at each point of eight positions separated by equal distances followed by polishing of each grinded sides to an octagonal shape; (l) drawing of octagonal cladding shaped fibers maintaining optimized condition such as preform feed-down rate within 0.6 to 0.7 mm/min and drawing speed within 20-25 m/min from the octagonal shaped preform using PC 375 L AP as low RI resin; (m) the doping levels of different elements in multielements silica glass core of fiber maintaining $P_2O_5$ concentrations between 22.0 to 23.85 wt % in the ultimate core layer; (n) maintaining $GeO_2$ concentrations between 1.5 and 2.5 wt % in the core layer, when added with $P_2O_5$; (o) maintaining F concentrations between 0.025 and 0.030 wt % in the core layer, when added with $P_2O_5$; (p) soaking the tube containing the porous soot layer into a solution containing RE, Al and Ce as their chloride salts while B in form of boric acid; maintaining $Al_2O_3$ concentrations between 0.356 to 0.525 wt %, $B_2O_3$ concentrations between 0.95 to 2.51 wt %, $CeO_2$ concentration within 0.12 to 0.191 wt %, $Er_2O_3$ concentration within 0.41 to 0.605 wt % and $Yb_2O_3$ concentration within 4.54 to 5.1 wt %; (q) maintaining Yb to Er ratio from 7 to 11; (r) measurement of lasing performance under 940 nm laser diode pumping; (s) On-line measurement of the stability of lasing output power under variation of the radiation dose rates of $^{60}$Co gamma radiation from 0.35 to 0.70 rad/s (equivalent to dose rates in free space) upto cumulative dose of 6.0 Krad.

In the present invention, we propose the use of multielements silica glass as a single complete solution providing low to moderately high output power (5 to 20 W) with good lasing efficiency (>38.0%) without self lasing around 1.0 micron with good stability of output power under $^{60}$Co gamma-radiation environment having degradation of lasing output power (<10.0% of the initial power) as follows.

In an embodiment of the present invention the PD resistivity in Er/Yb codoped multielement silica glass based fibers can be greatly improved due to presence of Ce to the core glass composition where each valence state of Ce ions can reduce the number of color centers effectively by capturing both hole and electron related colour centers for enhancement of the radiation resistance behavior of the fiber in ionizing radiation environment. On the other hand, $P_2O_5$ doping levels of 22.0 to 23.85 wt % along with minor doping of $B_2O_3$ in multielements silica glass can transfer the energy effectively from excited Yb ions to Er ions as the glass reduces the fluorescence life time of $^4I_{11/2}$ level of Er with increasing the fluorescence life time of $^4I_{13}/2$ level of Er to get high lasing efficiency above 38.0% with maximum output power of 20.0 W. On the other hand, the suitable doping levels of Yb within 4.54-5.1 wt % and Er within 0.41-0.605 wt % along with their ratio within 7.5 to 11.0 in this multielement silica glass suppress the 1.0 micron $Yb^{3+}$ self lasing intrinsically which provide also the high lasing efficiency above 38% with maximum 20.0 W output power. The present invention is illustrated in FIGS. 1 to 10 of the drawing accompanying this specification.

Figure 1:
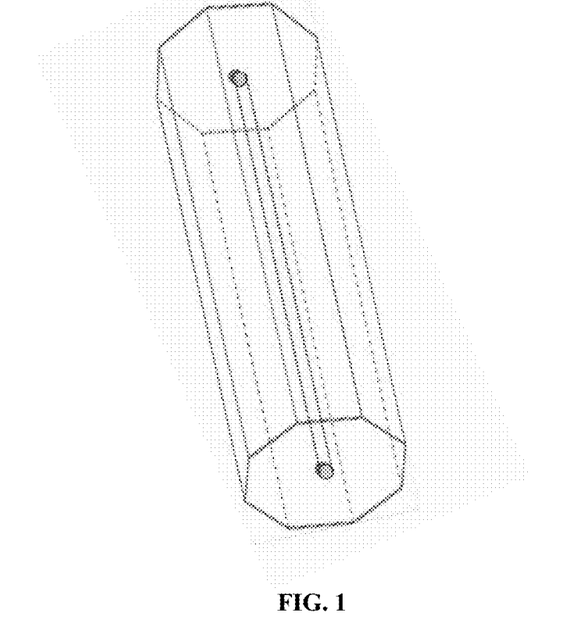
FIG. 1 represents the axial view of Octagonal shaped preform made from circular pristine preform through grinding of 0.75 mm length from the periphery of circular overcladded preform of 18.6 mm diameter at each point of eight positions separated by equal distances mentioned in Example-3 in accordance with an embodiment of the present invention.
Figure 2:
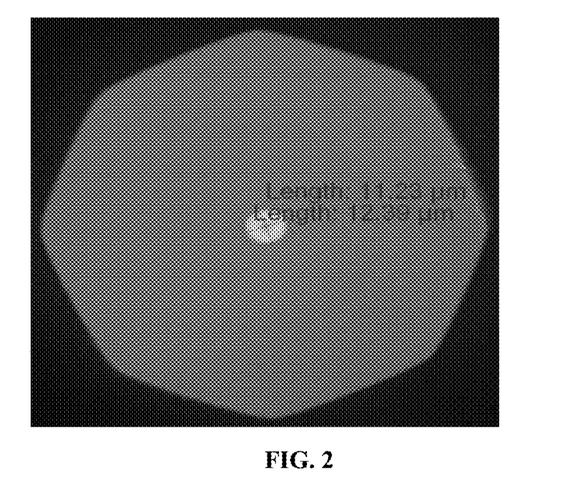
FIG. 2 represents a cross sectional view of fabricated octagonal cladding shaped fiber having average 11.81 micron core diameter mentioned in Example-3 in accordance with an embodiment of the present invention.
Figure 3:
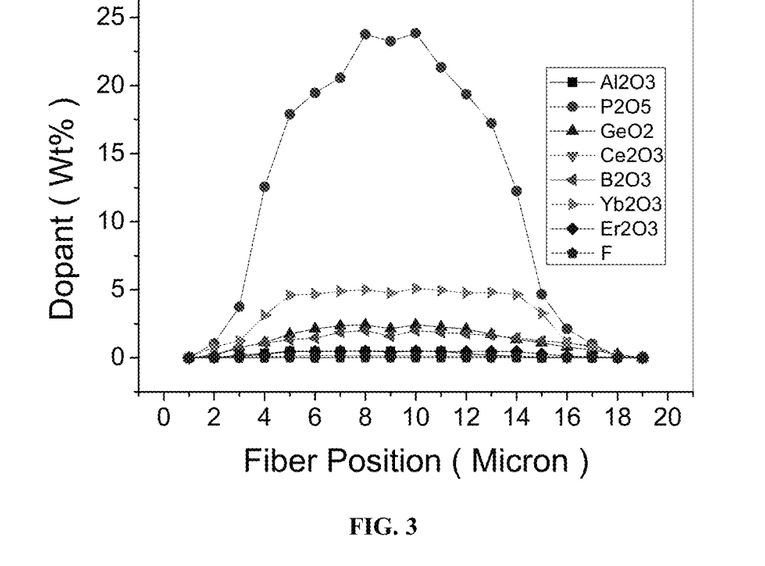
FIG. 3 represents the elemental distribution profile along the core diameter measured from the electron probe micro analysis (EPMA) data of fiber sample showing uniform distribution of all the multielements along the core diameter mentioned in Example-3 in accordance with an embodiment of the present invention.
Figure 4:
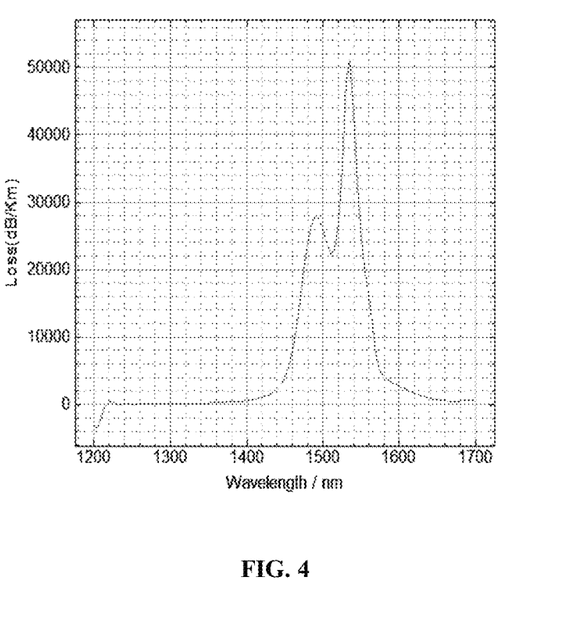
FIG. 4 represents the loss curve showing core absorption 52.0 dB/m at 1530 nm of fiber sample mentioned in Example-3 in accordance with an embodiment of the present invention.
Figure 5:
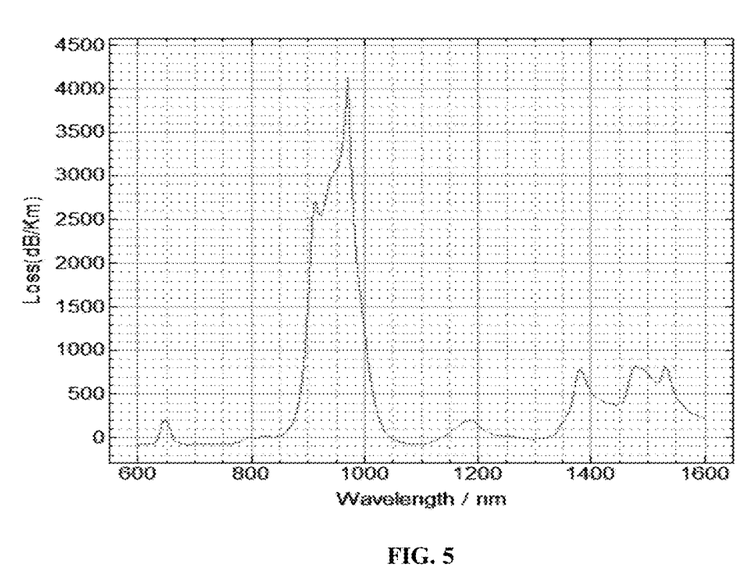
FIG. 5 represents the loss curve showing cladding absorption 2.6 dB/m at 915 nm of fiber sample mentioned in Example-3 in accordance with an embodiment of the present invention.
Figure 6:
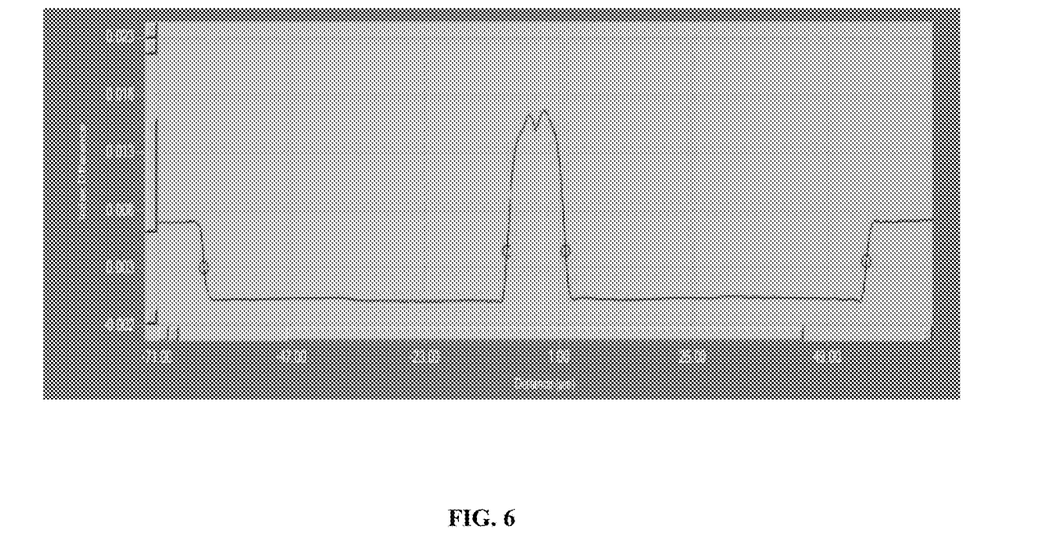
FIG. 6 represents the refractive index profile (RIP) of the fiber sample showing numerical aperture 0.24±0.01 measured by Fiber Analyzer mentioned in Example-3 in accordance with an embodiment of the present invention.
Figure 7:
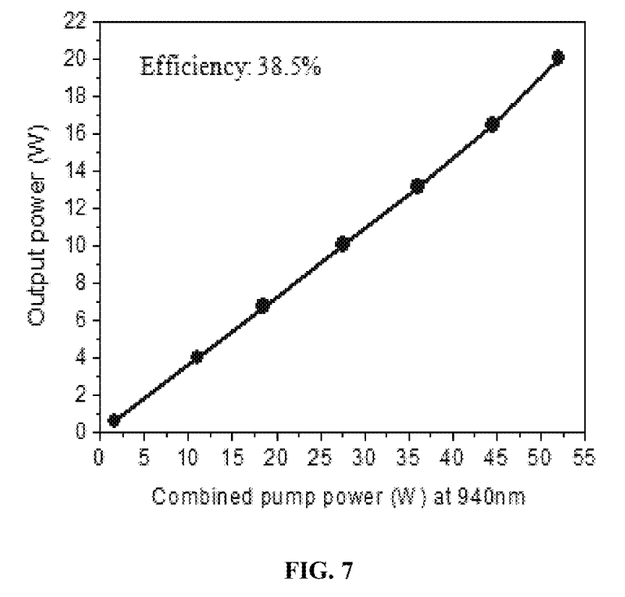
FIG. 7 represents the efficiency curve of output power at 1558 nm wavelength using a 6.5 meter length of fiber sample under pumping at 940 nm showing 38.5% efficiency mentioned in Example-3 in accordance with an embodiment of the present invention.
Figure 8:
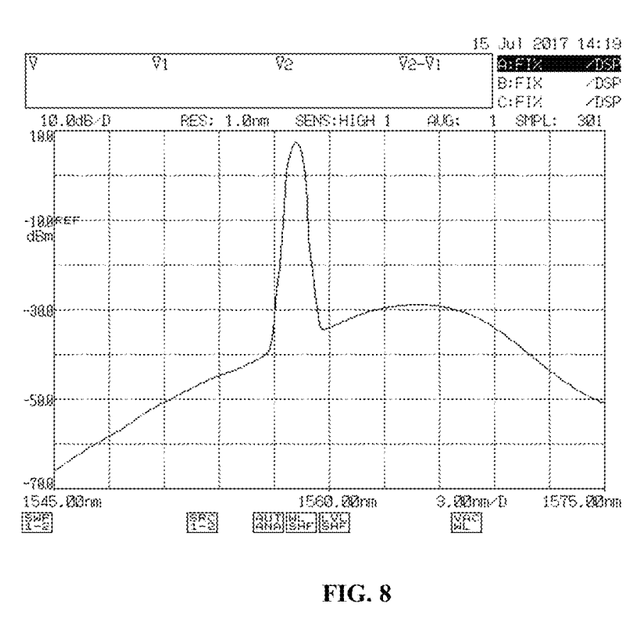
FIG. 8 represents the lasing output spectra under 52.5 W launched pump power at 940 nm using 6.5 meter of fiber sample showing 20.0 W output power mentioned in Example-3 in accordance with an embodiment of the present invention.
Figure 9:
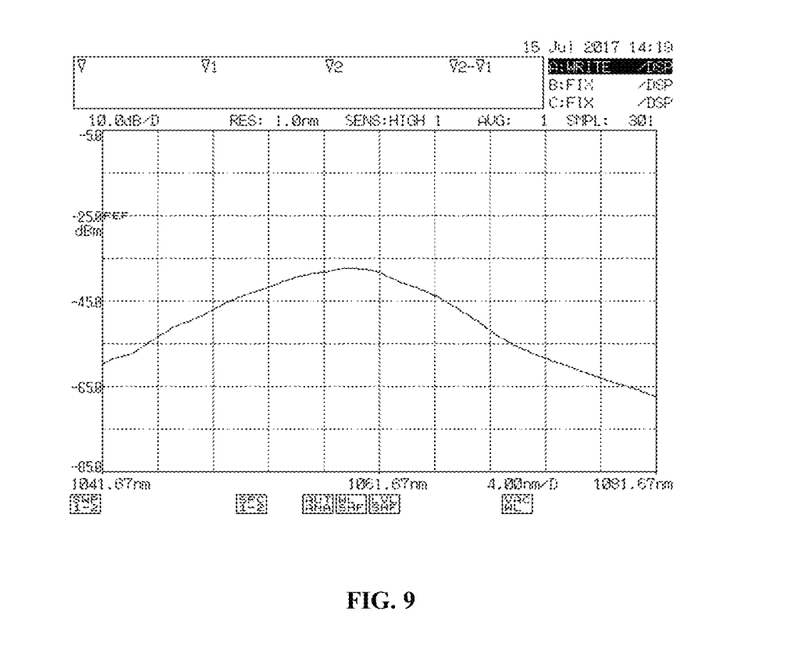
FIG. 9 represents 1 µm Yb ASE at 20.0 W output power level of fiber sample showing no 1.0 micron $Yb^{3+}$ self lasing mentioned in Example-3 in accordance with an embodiment of the present invention.
Figure 10:
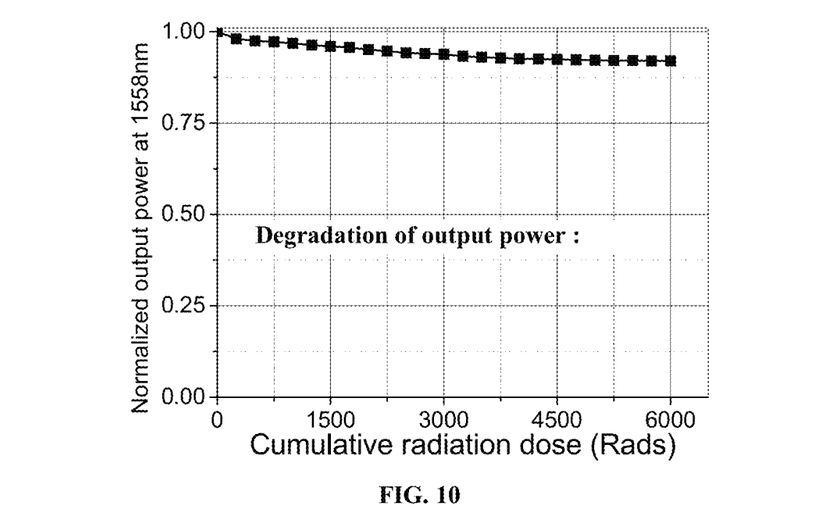
FIG. 10 represents the normalized output power of Er/Yb codoped fiber against on-line $^{60}$Co-gamma radiation having dose rate of 0.35 rad/sec showing 8.0% degradation of output power mentioned in Example-3 in accordance with an embodiment of the present invention.

In another embodiment of the present invention, the Octagonal shaping of the overcladded preform by proper grinding process through milling of the silica cladding material varying the grinding length 0.72 to 0.75 mm from the periphery of circular overcladded preform at each point of eight positions separated by equal distances followed by polishing of each grinding sides was made in order to increase the pump absorption efficiency. In FIG. 1 described the axial view of one octagonal shaped preform made from circular pristine preform through grinding of 0.75 mm length from the periphery of circular overcladded preform of 18.6 mm diameter at each point of eight positions separated by equal distances in accordance with an embodiment of the present invention. The Octagonal cladding shaped fiber drawn from such octagonal shaped preform under optimized preform feed down and fiber drawing speed. In FIG. 2 described the cross sectional view of fabricated octagonal cladding shaped fiber having an average 11.81 micron core diameter of one of the fibers in accordance with an embodiment of the present invention. The present invention provide the optimized process parameters for uniform doping of all the elements along the core diameter of one fiber for achieving good lasing efficiency above 38.0%. In FIG. 3 described the elemental distribution profile along the core diameter measured from the electron probe micro analysis (EPMA) data of fiber sample showing uniform distribution of all the multielements along the core diameter in accordance with an embodiment of the present invention. In the present invention, the suitable doping levels of Er and Yb ions in multielement doped silica glass based optical fibers showing core absorption losses within 1.9-2.8 dB/m at 915 nm and cladding absorption losses within 37.0-52.0 dB/m at 1530 nm exhibit good lasing efficiency above 38.0% for getting 5.0 to 20.0 W output power with suppression 1.0 micron $Yb^{3+}$ self lasing. In FIGS. 4 and 5 described the core absorption loss of 52.0 dB/m at 1530 nm and cladding absorption loss of 2.6 dB/m at 915 nm of one of the developed fibers in accordance with an embodiment of the present invention. In FIG. 6 described the refractive index profile (RIP) of the fiber sample showing numerical aperture 0.24±0.01 measured by Fiber Analyzer mentioned in accordance with an embodiment of the present invention. In FIG. 7 described the lasing efficiency at 1558 nm wavelength using a 6.5 meter length of fiber sample under pumping at 940 nm showing 38.5% efficiency in accordance with an embodiment of the present invention. In FIG. 8 described the lasing output spectra under 52.5 W launched pump power at 940 nm using 6.5 meter of fiber sample showing 20.0 W output power in accordance with an embodiment of the present invention. In FIG. 9 described 1 μm Yb ASE at 20.0 W output power level of fiber sample showing no 1.0 micron $Yb^{3+}$ self lasing in accordance with an embodiment of the present invention. In FIG. 10 described the normalized output power of Er/Yb codoped fiber against on-line $^{60}$Co-gamma radiation having dose rate of 0.35 rad/sec showing 8.0% degradation of output power which makes this fiber suitable for high power optical amplifier application in CATV, free space communication and FTTH in accordance with an embodiment of the present invention.

The use of multielements silica glass as an alternate solution to overcome the above mentioned problems. The novelty of fabricated fiber is use of multielement glass of suitable composition where F doping helps to achieve radiation hardness by elimination Si and P-related defect center, Ce-doping helps to prevent the formation of Yb-related defect centers, P doping enhances Er/Yb solubility in glass and Al doping levels require optimization to minimize the formation of Al—O hole defect centers, Ge doping helps to control numerical aperture (0.19 to 0.25) while B along with P doping enhance the energy transfer efficiency from Yb to Er by reducing the fluorescence life time of $^4I_{11/2}$ level of Er while increasing the fluorescence life time of $^4I_{13/2}$ level of Er to suppress 1.0 micron Yb self lasing intrinsically, which makes this fiber suitable for high power optical amplifier application having output power 5.0 W (+37 dBm)-20.0 W (+43 dBm) showing <10% degradation of lasing output power under cumulative radiation dose of $^{60}$Co gamma radiation up to 6.0 Krad at low dose rates (~0.35 to 0.70 rad/s) equivalent to dose rates in free space radiation.

Deposition of porous core layer of suitable composition containing $SiO_2$—$P_2O_5$—F employing backpass deposition technique at suitable deposition temperature followed by pre-sintering of porous soot layer prior to solution doping maintaining suitable burner speed and temperature; impregnation of porous soot layer into an alcoholic solution comprising suitable dopants like Al, Yb, Er, Ce, and B for definite time span followed by drying, oxidation and sintering along with repetition of above mentioned steps 2-3 times; collapsing of the tube by reducing one end of the tube very close to sealing to avoid evaporation of different dopants; overcladding of the initial preform made by the above steps; grinding and shaping of the fabricated preform to octagonal shape.

The following examples are given by way of illustration of the working of the invention in actual practice and therefore should not be construed to limit the scope of the present invention.

Example 1

Deposition of pure $SiO_2$ layers inside a silica glass substrate tube employing MCVD process at a temperature of 1850° C. to achieve match clad geometry.

Unsintered core deposition at a temperature of 1430±5° C. using backpass deposition technique maintaining burner speed of 30 mm/min comprising $P_2O_5$ and F with flow of 800 sccm $O_2/POCl_3$ and 25.0 sccm $SF_6$.

Pre-sintering of the porous soot layer was performed at a temperature of 1120±5° C. maintaining burner speed of 315 mm/min to maintain uniform porosity.

The porous soot layer was dipped in an alcoholic soaking solution containing 0.12 (M) $AlCl_3$ $6H_2O$, 0.02(M) $ErCl_3$ $6H_2O$, 0.25(M) $YbCl_3$ $6H_2O$, 0.003(M) $CeCl_3$ $7H_2O$ and 0.5(M) $H_3BO_3$ as chloride precursor of Al, Er, Yb and Ce in addition to Boric acid as a source of B. The composition was selected to achieve $Al_2O_3$ concentration of 0.356 wt %, $Er_2O_3$ concentration of 0.41 wt %, $Yb_2O_3$ concentration of 4.54 wt %, the $CeO_2$ concentration of 0.12 wt % and $B_2O_3$ 0.95 wt % along with with Yb to Er ratio of 11.07 determined from electron prove microanalyses (EPMA).

After draining out of the solution, the soaked layer was dried with flow of inert Ar gas for 30 minutes.

Remounting the soaked tube in MCVD lathe and oxidation was performed in the presence of $O_2$ and He around 700-850° C. in a stepwise manner maintaining a constant $He/O_2$ ratio of 0.5.

Dehydration was carried out at a temperature of 900° C. with a $Cl_2:O_2$ ratio of 2.5:1.

Sintering of the core layer was performed in the presence of a mixture of $O_2$ and He in the temperature range of 1350 to 1850° C. along with flow of $O_2/GeCl_4$ at the rate of 5.0 sccm and $O_2/POCl_3$ at 10.0 sccm for conversion of the soaked deposited multielements doped porous layer into transparent glass layer smoothly.

The vapor phase composition of porous layer as well as flow of $O_2/GeCl_4$ and $O_2/POCl_3$ was adjusted such that final preform core comprised of 22 wt % $P_2O_5$, 1.5 wt % $GeO_2$ and 0.025 wt % F.

To achieve the desired core thickness starting from deposition of porous soot layer up to the sintering step was repeated two times to achieve the final core thickness of 10 μm in ultimate fiber.

Collapsing of the tube in 2 steps at a temperature in the range of 2000–2150° C. to obtain solid rod called preform in the presence of $O_2/POCl_3$ flow at the rate of 4.0 sccm with one end of tube nearly closed to avoid central dip formation significantly in their RI profile.

Jacketing the preform with silica tubes of OD/ID: 20/12 mm dimensions was performed to get final preform of 18.5 mm diameter.

Grinding of 0.73 mm length from the surface of circular overcladded preform along each of eight point on equal distance followed by polishing of the each grinded side into Octagonal shaped structure.

Drawing of fibers with preform feed rate of 0.6 mm/min with drawing speed of 20 m/min from the octagonal shaped preform using PC 375 L AP low RI resin was performed to achieve the final fiber of core diameter 10 μm, with numerical aperture 0.20±0.01.

The absorption of the fabricated fiber was measured which exhibited cladding absorption of 1.9 dB/m at 915 nm and core absorption of 37 dB/m at 1530 nm.

The fabricated fiber exhibited 5.35 W output power with lasing efficiency of 38.2% without showing any Yb self lasing at 1 μm.

The fabricated fiber suppress the degradation of lasing output power (8.8% of the initial power) under $^{60}$Co-gamma irradiation upto cumulative radiation of 6.0 Krad under dose rates of 0.70 rad/s (Dose rate equivalent to free space).

Example 2

Deposition of pure $SiO_2$ layers inside a silica glass substrate tube employing MCVD process at a temperature of 1850° C. to achieve match clad geometry.

Unsintered core deposition at a temperature of 1450±5° C. using backpass deposition technique maintaining burner speed of 35 mm/min comprising $P_2O_5$ and F with flow of 875 sccm $O_2$/$POCl_3$ and 32.0 sccm $SF_6$.

Pre-sintering of the porous soot layer was performed at a temperature of 1100±5° C. maintaining burner speed of 305 mm/min to maintain uniform porosity.

The porous soot layer was dipped in an alcoholic soaking solution containing 0.15 (M) $AlCl_3$ $6H_2O$, 0.023(M) $ErCl_3$ $6H_2O$, 0.25(M) $YbCl_3$ $6H_2O$, 0.0032(M) $CeCl_3$ $7H_2O$ and 0.6(M) $H_3BO_3$ as chloride precursor of Al, Er, Yb and Ce in addition to Boric acid as a source of B. The composition was selected to achieve $Al_2O_3$ concentration of 0.525 wt %, $Er_2O_3$ concentration of 0.605 wt %, $Yb_2O_3$ concentration of 4.54 wt %, $CeO_2$ concentration of 0.131 wt % and $B_2O_3$ 1.12 wt % along with with Yb to Er ratio of 7.5 determined from electron prove microanalyses (EPMA).

Remounting the soaked tube in MCVD lathe and oxidation was performed in presence of $O_2$ and He around 750-825° C. in a stepwise manner maintaining a constant He/$O_2$ ratio of 0.5.

Dehydration was carried out at a temperature of 875° C. with a $Cl_2$:$O_2$ ratio of 2:1.

Sintering of the core layer was performed in the presence of a mixture of $O_2$ and He in the temperature range of 1350 to 1875° C. along with flow of $O_2$/$GeCl_4$ at the rate of 10.0 sccm and $O_2$/$POCl_3$ at 12.0 sccm for conversion of the soaked deposited multielements doped porous layer into a transparent glass layer smoothly.

The vapor phase composition of porous layer as well as flow of $O_2$/$GeCl_4$ and $O_2$/$POCl_3$ was adjusted such that final preform core comprised of 23 wt % $P_2O_5$, 2.5 wt % $GeO_2$ and 0.028 wt % F.

To achieve the desired core thickness starting from deposition of porous soot layer up to the oxidation of the soaked soot layer was repeated three times to achieve the final core thickness of 11.4 μm in ultimate fiber.

Collapsing of the tube in 3 steps at a temperature in the range of 2000-2200° C. to obtain solid rod called preform in the presence of $O_2$/$POCl_3$ flow at the rate of 5.0 sccm with one end of tube nearly closed to avoid central dip formation significantly in their RI profile.

Jacketing the preform with silica tube of OD/ID: 20/12 mm dimensions was performed to get final preform of 18.4 mm diameter.

Grinding of 0.72 mm length from the surface of circular overcladded preform along each of eight points on equal distance followed by polishing of the each grinded side into Octagonal shaped structure.

Drawing of fibers with preform feed rate of 0.7 mm/min with drawing speed of 25 m/min from the octagonal shaped preform using PC 375 L AP low RI resin was performed to achieve the final fiber of core diameter 11.4 μm, with numerical aperture 0.23±0.01.

The absorption of the fabricated fiber was measured which exhibited cladding absorption of 2.8 dB/m at 915 nm and core absorption of 50 dB/m at 1530 nm.

The fabricated fiber exhibited 11.4 W output power with lasing efficiency of 40.7%. Fiber exhibited ASE without any Yb self lasing at 1 μm.

The fabricated fiber suppress the degradation of lasing output power (5.1% of the initial power) under $^{60}$Co-gamma irradiation upto cumulative radiation of 6.0 Krad under dose rates of 0.35 rad/s (Dose rate equivalent to free space).

Example 3

Deposition of pure $SiO_2$ layers inside a silica glass substrate tube employing MCVD process at a temperature of 1870° C. to achieve match clad geometry.

Unsintered core deposition at a temperature of 1425±5° C. using backpass deposition technique maintaining burner speed of 28 mm/min comprising $P_2O_5$ and F with flow of 900 sccm $O_2$/$POCl_3$ and 35.0 sccm $SF_6$.

Pre-sintering of the porous soot layer was performed at a temperature of 1080±5° C. maintaining burner speed of 310 mm/min to maintain uniform porosity.

The porous soot layer was dipped in an alcoholic solution containing 0.14 (M) $AlCl_3$ $6H_2O$, 0.022(M) $ErCl_3$ $6H_2O$, 0.28(M) $YbCl_3$ $6H_2O$, 0.0035(M) $CeCl_3$ $7H_2O$ and 0.75(M) $H_3BO_3$ as chloride precursor of Al, Er, Yb and Ce in addition to Boric acid as a source of B. The composition was selected to achieve $Al_2O_3$ concentration of 0.50 wt %, $Er_2O_3$ concentration of 0.50 wt %, $Yb_2O_3$ concentration of 5.10 wt %, $CeO_2$ concentration of 0.191 wt % and $B_2O_3$ 2.51 wt % along with with Yb to Er ratio of 10.17 determined from electron prove microanalyses (EPMA).

Unsintered core deposition at a temperature of 1425±5° C. using backpass deposition technique maintaining burner speed at 28 mm/min comprising $P_2O_5$ along with $GeO_2$ and F. The vapor phase composition of porous layer was adjusted such that final preform core comprised of $P_2O_5$ concentrations of 23.85 wt %, $GeO_2$ concentrations 2.43 wt % and F concentrations around 0.030 wt %.

Pre-sintering of the porous soot layer was performed at a temperature of 1080±5° C. maintaining burner speed of 310 mm/min to maintain uniform porosity.

Remounting the soaked tube in MCVD lathe and oxidation was performed in the presence of $O_2$ and He around 700-825° C. in a stepwise manner maintaining a constant He/$O_2$ ratio of 0.5.

Dehydration was carried out at a temperature of 850° C. with a $Cl_2$:$O_2$ ratio of 2:1.

To achieve the desired core thickness starting from deposition of porous soot layer up to the oxidation of the soaked soot layer was repeated 3 times to achieve the final core thickness of 11.81 m in ultimate fiber.

Sintering of the core layer was performed in the presence of a mixture of $O_2$ and He in the temperature range of 1370 to 1890° C. along with flow of $O_2/GeCl_4$ at the rate of 7.0 sccm and $O_2/POCl_3$ at 15.0 sccm for conversion of the soaked deposited multielements doped porous layer into a transparent glass layer smoothly.

The vapor phase composition of porous layer as well as flow of $O_2/GeCl_4$ and $O_2/POCl_3$ was adjusted such that final preform core comprised of 23.85 wt % $P_2O_5$, 2.43 wt % $GeO_2$ and 0.030 wt % F.

Collapsing of the tube in 3 steps at a temperature in the range of 2000-2250° C. to obtain solid rod called preform in the presence of $POCl_3$ flow with one end of tube nearly closed to avoid $P_2O_5$ and $GeO_2$ evaporation.

Jacketing the preform with silica tube of OD/ID: 20/12 mm dimensions was performed prior to grinding of the preform followed by polishing to octagonal shape of final diameter around 18.6 mm.

Grinding of 0.75 mm length from the surface of circular overcladded preform along each of 6 points on equal distance followed by polishing of each grinded side into Octagonal shaped structure.

Drawing of fibers with preform feed rate of 0.65 mm/min with drawing speed of 20 m/min from the octagonal shaped preform using low RI resin was performed to achieve the final fiber of core diameter 11.81 μm, with numerical aperture 0.24±0.01.

The absorption of the fabricated fiber was measured which exhibited cladding absorption of 2.6 dB/m at 915 nm and core absorption of 52 dB/m at 1530 nm.

The fabricated fiber exhibited 20 W output power with lasing efficiency of 38.5%. Fiber exhibited ASE without any Yb self lasing at 1.0 μm.

The fabricated fiber suppress the degradation of lasing output power (8.0% of the initial power) under $^{60}$Co-gamma irradiation upto cumulative radiation of 6.0 Krad under dose rates of 0.54 rad/s (Dose rate equivalent to free space).

Advantages of Present Invention

The main advantages of the present invention are:
i) Er/Yb co-doped multielements silica glass based cladding pump octagonal shaped low RI coated fiber made by MCVD process in combination with solution doping technique provide output power up to 20.0 W with lasing efficiency >38.0% without $Yb^{3+}$ self lasing around 1 μm.
ii) Uniform doping of different multielements such as Er, Yb, P, Al, Ce, Ge, B and F along the fiber core diameter through the present invention could be maintained with uniform RI and minimized the central dip formation which reduces the clustering behavior of rare earth ions and enhanced energy transfer from Yb to Er ions to achieve high output power with good lasing efficiency.
iii) Sintering of the multielements doped porous core layer with flow of $O_2/GeCl_4$ and $O_2/POCl_3$ for conversion of the soaked deposited multielements doped porous layer into transparent glass layer smoothly which provide to make bubble free core glass.
iv) Self lasing at 1.0 μm is eliminated by using multielements glass composition achieving maximum output power of 20 W by optimization of the doping levels of $P_2O_5$, $B_2O_3$, $CeO_2$, $Er_2O_3$ and $Yb_2O_3$ along with the Yb/Er ratio within 7.5 to 11 for efficient energy transfer from Yb to Er ions.
v) Suppression of the Photodarkening phenomenon has been achieved through optimization of the doping levels of $Al_2O_3$ along with $CeO_2$ with respect to the doping levels of $Er_2O_3$ and $Yb_2O_3$ by minimizing the formation of $Yb^{2+}$ ion and Al—O hole centers.
vi) The radiation resistance behavior of the developed Er/Yb doped fiber (degradation of output power <10% of the initial power) suitable for free space application as investigated using $^{60}$Co gamma radiation under low dose rate equivalent to the free space radiation achieved through optimization of the doping levels of F, $CeO_2$ along with $B_2O_3$.
vii) The developed Er/Yb codoped cladding pump optical fiber based on multielements silica glass will be very useful for making of high power optical amplifier to be used efficiently in free space communication systems, Fiber to the Home (FTTH) and CATV applications

We claim:
1. A process for fabricating erbium and ytterbium-co-doped multi-elements silica glass based cladding-pumped fiber for use as an optical amplifier, the process comprising the steps of:
 a) depositing a pure $SiO_2$ synthetic cladding within a silica glass substrate tube to obtain match clad structure;
 b) forming a porous core layer inside the silica glass substrate tube by depositing a fluorinated-phospho silica porous soot layer using a flow of $O_2/POCl_3$ in a range of 800 to 900 sccm and $SF_6$ in a range of 25 to 35 sccm, at a temperature in a range of 1420-1455° C. and maintaining a burner speed a range of 28-35 mm/min;
 c) pre-sintering the deposited fluorinated-phospho silica porous soot layer at a temperature in a range of 1075-1125° C. by keeping the burner speed in a range of 305-315 mm/min in a forward direction to maintain a uniform porosity;
 d) soaking the pre-sintered fluorinated-phospho silica porous soot layer into an alcoholic solution for one hour, wherein the alcoholic solution comprises $AlCl_3$ $6H_2O$ in a range of 0.12 to 0.15 (M), $ErCl_3$ $6H_2O$ in a range of 0.02 to 0.023(M), $YbCl_3$ $6H_2O$ in a range of 0.25 to 0.28 (M), $CeCl_3$ $7H_2O$ in a range of 0.003 to 0.0035(M) and $H_3BO_3$ in a range of 0.5 to 0.75(M);
 e) drying the soaked fluorinated-phospho silica porous soot layer under flow of an inert Ar gas for 30 to 45 minutes;
 f) incorporating $Er_2O_3$, $Yb_2O_3$, $P_2O_5$, F, $CeO_2$, $Al_2O_3$ and $B_2O_3$ into the dried fluorinated-phospho silica porous soot layer in the presence of $O_2$ and He at a temperature within a range of 700-850° C. for efficient oxidation to form the core layer;
 g) dehydrating the core layer at a temperature in a range of 850 to 900° C. in presence of $Cl_2$ and $O_2$ to form a porous dried core layer;
 h) sintering the porous core layer in presence of a mixture of $O_2$ and He at a temperature in a range of 1350 to 1890° C. with flow of $O_2/GeCl_4$ and $O_2/POCl_3$ to form a final core layer;
 i) repeating steps (b) to (h) 2-3 times to form the final core layer of a thickness in a range of 10.0-11.5 μm;
 j) collapsing the silica glass substrate tube having the final core layer at a temperature in a range of 2000 to 2250° C. with the flow of $POCl_3$ to obtain an Er/Yb codoped multi-elements silica glass based optical preform of 10.0±0.1 mm diameter;

k) increasing the preform diameter from 10.0±0.1 mm to 18.5±0.1 mm through an overcladding process using a thick silica tube at a temperature in a range of 2200 to 2400° C. to form an overcladded preform;

l) grinding the overcladded preform to a grinding length in a range of 0.72-0.75 mm from a periphery of the overcladded preform at each point of eight positions separated by equal distances followed by polishing of each grinded sides to form an octagonal shaped preform; and m) drawing an octagonal cladding shaped Er/Yb doped fiber from the octagonal shaped preform using a PC 375L AP compound as a low RI resin coating at a preform feed down speed in a range of 0.6 to 0.7 mm/min and at a fiber drawing speed in a range of 20-25 m/min.

2. The process as claimed in claim 1, wherein dehydrating the core layer in presence of $Cl_2$ and $O_2$ comprises dehydrating with 2:1 to 2.5: 1 of $Cl_2$ and $O_2$, and wherein sintering the porous dried core layer in presence of a mixture of $O_2$ and He comprises sintering the porous dried core layer with He: $O_2$ in a ratio of 0.5dehydrating the core layer in presence of $Cl_2$ and $O_2$ comprises dehydrating with 2:1 to 2.5: 1 of $Cl_2$ and $O_2$, and wherein sintering the porous dried core layer in presence of a mixture of $O_2$ and He comprises sintering the porous dried core layer with He: $O_2$ in a ratio of 0.5.

3. The process as claimed in claim 1, wherein sintering the porous dried core layer in presence of a mixture of $O_2$ and He with flow of $O_2/GeCl_4$ and $O_2/POCl_3$ comprises sintering with the flow of $O_2/GeCl_4$ in a range of 5 to 10 sccm and with the flow of $O_2/POCl_3$ in a range of 10 to 15 sccm to form a transparent glass layer.

4. The process as claimed in claim 1, wherein collapsing the silica glass substrate tube having the final core layer comprises collapsing with the flow of $O_2/POCl_3$ in a range of 4.0 to 7.0 sccm, and wherein one end of the silica glass substrate tube is nearly closed to avoid central dip formation in refractive index profile (RIP).

5. The process as claimed in claim 1, wherein increasing the preform diameter from 10.0±0.1 mm to 18.5±0.1 mm through the overcladding process using a thick silica tube comprises using the thick silica tube having a dimension of OD/ID of 20/12 mm to maintain a core diameter of the octagonal cladding shaped Er/Yb doped fiber in a range of 10.0 to 11.81 micron.

6. The process as claimed in claim 1, wherein incorporating $Er_2O_3$, $Yb_2O_3$, $P_2O_5$, F, $CeO_2$, $Al_2O_3$ and $B_2O_3$ comprises incorporating multi-elements Er, Yb, P, F, Ce, Al and B uniformly along a diameter of an octagonal classing shaped fiber.

7. The process as claimed in claim 1, wherein the octagonal cladding shaped Er/Yb doped fiber has a numerical aperture (NA) between 0.20±0.01 to 0.24±0.01 and wherein the octagonal cladding shaped Er/Yb doped fiber has a cladding absorption loss in a range from 1.9 to 2.8 dB/m at 915 nm and a core absorption loss in a range from 37 to 52 dB/m at 1530 nm.

8. The process as claimed in claim 1, wherein the incorporating $Er_2O_3$, $Yb_2O_3$, $P_2O_5$, F, $CeO_2$, $Al_2O_3$ and $B_2O_3$ comprises doping with $GeO_2$ in a range of 1.5 to 2.5 wt %, $CeO_2$ in a range of 0.12 to 0.191 wt %, $P_2O_5$ in a range of 22.0 to 23.85 wt %, $B_2O_3$ in a range of 0.95 to 2.51 wt %, F in a range of 0.025 to 0.030 wt %, $Al_2O_3$ in a range of 0.356 to 0.525 wt %, $Er_2O_3$ in a range of 0.41 to 0.605 wt %, $Yb_2O_3$ in a range of 4.54 to 5.10 wt % and Yb/Er ratio in a range of 7.5 to 11.07.

9. The process as claimed in claim 8, wherein doping $B_2O_3$ along with $P_2O_5$ reduces fluorescence life time of $^4I_{11/2}$ level of Er while increasing the fluorescence life time of $^4I_{13/2}$ level of Er; and wherein Yb/Er ratio in a range of 7.5 to 11.07 suppresses Yb self lasing at 1.0 micron intrinsically.

10. The process as claimed in claim 8, wherein the erbium and ytterbium (Er/Yb) co-doped multi-elements silica glass based cladding shaped fibers are configured to be used as fiber lasers and high power optical amplifiers generating 5.35 to 20 W power with lasing efficiency above >38%.

11. The process as claimed in claim 8, wherein the erbium and ytterbium co-doped multi-elements silica glass based cladding shaped fiber is suitable for use in a radiation environment exhibiting <10% degradation of output power under low dose rates of $^{60}Co$ gamma radiation up to 6.0 Krad, wherein dose rate varies from 0.35 to 0.70 rad/s, and wherein the dose rate is equivalent to dose rates in free space.

* * * * *